United States Patent [19]
Getty et al.

[11] Patent Number: 5,538,641
[45] Date of Patent: Jul. 23, 1996

[54] PROCESS FOR RECYCLING LADEN FLUIDS

[75] Inventors: Heather L. Getty, Plymouth; Michael S. Cypher, Monticello; David P. Hatz, Wayzata; Paul L. Miller, Minnetonka, all of Minn.

[73] Assignee: Global Environmental Solutions, Inc., Hopkins, Minn.

[21] Appl. No.: 365,665

[22] Filed: Dec. 29, 1994

[51] Int. Cl.$^6$ ...................................... B01D 63/00
[52] U.S. Cl. .................. 210/652; 210/651; 210/661; 210/805; 210/806; 210/702; 210/754; 210/767; 210/908; 134/10
[58] Field of Search ....................... 210/651, 652, 210/661, 690, 805, 807, 767, 702, 770, 749, 754, 908; 134/10

[56] References Cited

U.S. PATENT DOCUMENTS

| | | | |
|---|---|---|---|
| 4,342,638 | 8/1982 | Bahlstrom | 210/770 |
| 4,544,490 | 10/1985 | Erickson et al. | 210/806 |
| 4,665,240 | 5/1987 | Blytas et al. | 210/652 |
| 4,696,726 | 9/1987 | Blytas et al. | 210/652 |
| 5,034,134 | 7/1991 | George et al. | 210/651 |
| 5,080,806 | 1/1992 | Balzano | 210/805 |
| 5,320,756 | 6/1994 | Winston | 210/805 |
| 5,403,490 | 4/1995 | Desai | 210/651 |

OTHER PUBLICATIONS

Treatment of an RDX–TNT Waste from a Munitions Factory, Semmens, Michael J.; Barnes, David; O'Hara, Michael; Corporate Source: University of Minnesota, Dep. of Civil & Mineral Engineering, Minneapolis, MN, pp. 837–842. Proceedings in the 39th Industrial Waste Conference, May, 1984.

Modern TNT Manufacture with Complete Water Reuse, Bingham, Edward C., The Second National Conference on Complete Water's Interface with Energy, Air and Solids, pp. 1147–1151, 1975.

ADPA International Symposium Energetic Materials Technology (Orlando 1994) Munitions Disposal in the Netherlands: Technical Solutions for Environmental Problems, Drs. Nick van Ham, TNO PML, pp. 1–6.

Osmo® Membrane Systems brochure "The Right Solution", pp. 1–15 (1985/1989 Osmonics, Inc.).

*Primary Examiner*—Ana Fortuna
*Attorney, Agent, or Firm*—Merchant, Gould, Smith, Edell, Welter and Schmidt

[57] ABSTRACT

Described is a method to recycle laden fluid containing explosives or neutralized chemical agents. For example, the explosive laden fluid is passed through four filtering stages; a clarifier, a filter press, a sand filter and, ultimately, a reverse osmosis device. The feed water to the reverse osmosis device is a saturated solution of explosive or neutralizing chemical agent. The resulting permeate is about 10 ppm of explosive or neutralizing chemical agent.

19 Claims, 1 Drawing Sheet

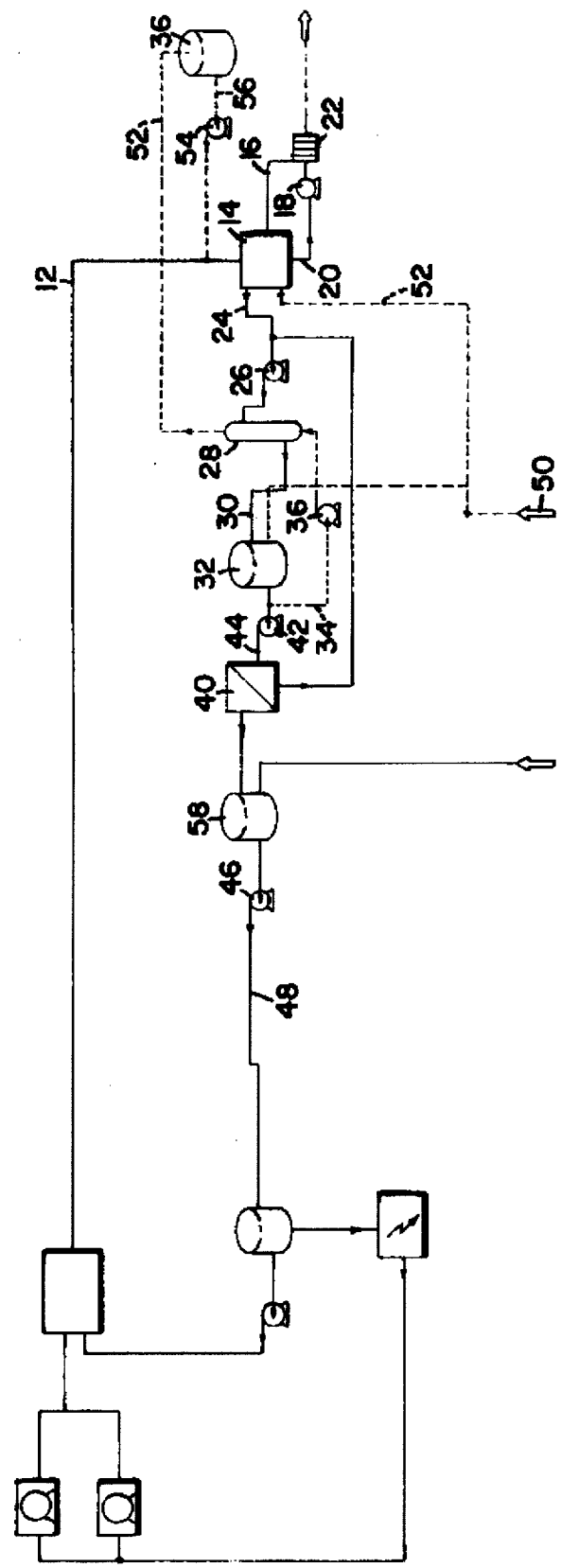

PROCESS FOR RECYCLING LADEN FLUIDS

FIELD OF INVENTION

The present invention relates to fluid or solvent recycling. More specifically, the invention relates to recycling of explosive laden fluids so that both the fluid and explosive are re-useable.

In another aspect, the present invention relates to water recycling of laden water containing neutralized chemical agents so that both the water and the neutralized chemical are re-useable.

BACKGROUND

Water reclamation in the manufacture of explosives has been a concern for a number of years. Though explosive laden water is only one by-product of explosive manufacture, it is also produced by other processes. Washout of explosive filled bodies for the purpose of demilitarization is one example.

A number of methods have been studied in efforts to reclaim or recycle water used in explosive manufacture or demilitarization or explosives or chemical agents. Such methods include neutralization, chemical precipitation, fractionation, solvent extraction, electrolytic reduction, activated carbon filtering, chlorination, bromination and ultraviolet light catalyzed oxidation. Of these, activated carbon filtration is one of the most commonly used reclamation means.

Activated carbon filtration, though, has a number of drawbacks. First, the explosive trapped by the carbon during filtration is not recoverable. Second, the activated carbon becomes exhausted and needs to be disposed of or reactivated. Third, even if the carbon is reactivated, the reactivation process generates waste products.

SUMMARY OF INVENTION

Reverse osmosis is not a method that has received much attention in reclamation of explosive laden water. One reason for this is that it is generally thought that reverse osmosis systems do not work well with saturated solutions. Reverse osmosis uses a semipermeable membrane to separate a feed stream into a permeate and a concentrate. The permeate is a purified stream that has passed through the membrane. The concentrate is a stream that contains impurities rejected by the membrane. If the impurities in the feed stream precipitate onto the membrane, the feed stream cannot effectively be separated into a permeate and a concentrate. It is generally thought that if the feed stream is a saturated solution, precipitation will occur. Therefore, reverse osmosis has not been used to filter saturated solutions of explosive.

Tests of the inventors, however, demonstrated that filtering a saturated solution of explosive with a reverse osmosis device did not result in precipitation of explosive onto the semipermeable membrane. Thus, reverse osmosis filtration was successfully used on saturated solutions of explosive. Further, reverse osmosis filtration achieved results as good as those achieved with activated carbon filtration but had none of the disadvantages.

Accordingly, the present invention is an improved method of recycling explosive laden fluid, e.g. water or other fluid used in washing out the explosive. In one aspect of the invention there is provided a method in which a saturated solution of explosive is filtered through a reverse osmosis device; the permeate resulting from the filtration being less than 10 ppm explosive.

In another aspect of the invention there is provided a method in which before the saturated explosive solution is filtered through reverse osmosis, it is filtered through a clarifier, filter press and sand filter. The clarifier allows explosive particulate to settle out of the suspending fluid resulting in a sludge of explosive. The filter press produces a filter cake from the sludge of explosive that is about 30% fluid, e.g. water and is saleable. The sand filter further filters out explosive particulate before saturated explosive solution is channeled into the reverse osmosis device. Also, it is not necessary that this stage of filtration be completed with a sand filter. Any type of cleanable filtration can be used.

In another aspect of the invention there is provided a method of recycling explosive laden fluid in which there are no significant waste products. A large portion of the explosive in the fluid is pressed into a filter cake for resale. Also, a large portion of the fluid is reusable in demilitarization or production.

Still another aspect of the invention is a method of recycling laden water containing neutralized chemical agents which saturated solutions are filtered through a reverse osmosis device. This water, the permeate, is recoverable for re-use. Reusing this water increases the efficiency of the operation by not storing, transporting, and destroying it as part of the water stream.

The present invention is not limited by the type of explosive contained in the fluid to be recycled. Explosives with which the invention will function effectively include: ammonium perchlorate (AP); 2,4,6 trinitro-1,3-benzenediamine (DATB); ammonium picrate (Explosive D); octahydro-1,3,5,7-tetranitro-1,3,5,7-tetrazocine (HMX); nitrocellulose (NC); nitroguanidine (NQ); 2,2-bis[(nitroxy) methyl] -1,3-propanediol dinitrate (PETN); hexahydro-1,3,5-trinitro-1,3,5,-triazine (RDX); 2,4,5-trinitrophenol (TNP); hexahydro-1,3,5-benzenetriamine (TATB); N-methyl N-2, 4,6 tetranitrobenzeneamine (Tetryl); 2-methyl-1,3,5-trinitrobenzene (TNT); Amatol (Ammonium Nitrate/TNT); Baratol (Ba $(NO_2)_7$/TNT); black powder ($KNO_3$/S/C); Comp A (RDX/wax); Comp B (RDX/TNT); Comp C (RDX/plasticizer); Cyclotol (RDX/TNT); plastic bonded explosives (PBX); LOVA propellant; NACO propellant; any combination of the above materials; rocket propellant; and Octol (HMX/TNT).

This list of explosives useable with the present invention is not intended to be complete. It is only representative of the materials that can be used with the present invention.

The present invention can also be used on a wide range of chemical agents which have been neutralized prior to reverse osmosis. These agents include, but are not limited to: choking agents such as phosgene; nerve agents such as tabun (ethyl N, N-dimethylphosphoramidocyanidate), sarin (isopropyl methyl phosphonofluoridate), VX and soman (pinacolyl methyl phosphonofluoridate) or blister agents such as HD distilled mustard (bis(2-chloroethyl)sulfide).

The laden fluid recycled in the invention is obtained from, e.g. the washout of explosive or chemical agents from bodies containing such, e.g. munitions, shells, projectiles, etc. The fluid is not limited to a specific type. It may be an erosive agent, a solvent agent, or a combination of both. Useable fluids include: aliphatic and aromatic hydrocarbons, such as naphtha and hexane; ketones, such as cyclohexanone and acetone; aromatic hydrocarbons, such as toluene and xylene; alcohols, such as ethanol and butanol; glycols, such as ethylene and propylene glycol; esters, such as ethyl acetate and n-butyl acetate; water; aqueous or non-aqueous mixtures of the above listed chemicals; aqueous or non-aqueous solutions for the neutralization of chemical agents, such as 5% aqueous solutions of alkali or alkaline earth metal hydroxides and/or hypochlorites (e.g. sodium or calcium hydroxide and/or hypochlorite) for use on neutralizing chemical agents, for example, GB ("sarin") nerve agent; gases that are liquified by pressure, such as propane, butane, and carbon dioxide; gases that are liquified by reduced temperature, such as propane, argon, and nitrogen; and liquified solids, such as microcrystalline wax and low temperature eutectic alloys.

The present invention has a number of distinct advantages over activated carbon filtration. First, a large quantity of the explosive in the explosive laden fluid is made available for resale or reuse. Second, there is no large quantity of carbon to be disposed of or reactivated. Third, there are no significant waste products of any type; essentially all of the input into the system is separated into non-waste output.

For a better understanding of the invention and advantages of its use, reference should be made to the drawings and accompanying descriptive matter in which there is illustrated and described a preferred embodiment of the invent ion.

BRIEF DESCRIPTION OF THE DRAWING

The drawing shows a block diagram of the four stages of filtration; clarification, filter pressing, sand filtration and reverse osmosis.

DETAILED DESCRIPTION OF THE INVENTION

Referring to the drawing, the system for the method of recycle of explosive laden fluid is shown generally at 10. Feed pipe 12 channels the fluid, e.g. water, discharged from a high pressure fluidjet explosive or chemical agent washout station into clarifier 14. Although the present invention is not limited by the type of explosive or chemical agent to be removed from the feed fluid, the explosive removed in the preferred embodiment is TNT. In the case of TNT, feed water discharged from the washout station is about 25,000 ppm TNT. The clarifier 14 is a commercial unit. Clarifiers are available from a number of manufacturers and are well known in the art. In the clarifier 14, suspended particles of TNT settle out of the feed water. Makeup water from the makeup water source 50 is channeled through pipe 52 whenever the reclamation system needs additional water.

The TNT sludge resulting from clarification is pumped from the bottom of the clarifier 14, through pipe 20 into the filter press 22. The sludge is about 100,000 ppm TNT. The filter press 22 is a METCHEM unit. Filter presses are available from a number of manufacturers and are well known in the art. In the filter press 22 water is mechanically wrung from the TNT particles. The result is a saleable filter cake of TNT that is about 700,000 ppm TNT. The water from which the TNT particles are mechanically wrung is channeled back through pipe 16 into clarifier 14. This process of production of a filter cake is continuous. Though a complete filter cake is not produced every cycle of the filter press 22, the filter press 22 cycles, for example, once about every 0.5 to 1 minute.

The clarified water is pumped out of the clarifier 14 by pump 26 through pipe 24 into the sand filter 28. The sand filter 28 is a commercial unit. Sand filters are available from a number of manufacturers and are well known in the art.

The sand filtered water is channeled through pipe 30 into surge tank 32. Surge tank 32 is a 1000 gallon vessel used to compensate for variances in volume flow through different points in the reclamation system.

At periodic intervals, the sand filter 28 is cleaned of built-up filtrate. The removed built-up filtrate is then processed through the system. Filtered water from pipe 44 is pumped by pump 36 through pipe 34 up through the bed of the sand filter 28. This water acts to remove the built-up filtrate from the sand. This backwash is then channeled out of the sand filter 28 through pipe 53 and into surge tank 38. From surge tank 38 the backwash is pumped by pump 54 through pipe 56 back into feed pipe 12 to be processed through the recycle system.

From the surge tank 32, sand filtered water is pumped by pump 42 through pipe 44 through a 5 micron cartridge filter (not shown). Cartridge filters are available from numerous manufacturers and are well known in the art. The water is then channeled into the reverse osmosis device 40. The water entering the reverse osmosis device 40 is about 120 to about 1000 ppm TNT and is a saturated solution. The reverse osmosis device 40 used may be any commercially available reverse osmosis device equipped with e.g. polyamide (PA) or cellulose acetate (CA) sepralators. As preferred embodiments, devices manufactured by Osmonics Inc. may be used such as OSMO model 19E-HR or model 43 CHF-HR. The concentrate produced by the reverse osmosis is channeled back to pipe 24 and is pumped by pump 26 back into the sand filter. The concentrate is about 230 ppm TNT. The permeate is less than about 10 ppm TNT. The permeate is combined with permeates from other recycling systems in surge tank 58. The permeate is then pumped by pump 46 through pipe 48 and is used as supply water for the explosive washout station that produced the original feed water.

EXAMPLES

In testing of saturated solutions of explosive on a reverse osmosis device, a saturated solution containing about 130 ppm TNT was fed into an Osmonics OSMO Model 19E-HR(PA) 500/ECN-60Hz reverse osmosis device equipped with polyamide (PA) sepralators. The water was run through a 25 micron filter and a 5 micron filter prior to the reverse osmosis process. The concentrate and permeate from the reverse osmosis process were recombined and used as feed water. The system was operated for a total of 30 hours over several days. The entire system performed perfectly throughout the test period.

Though numerous characteristics and advantages of the invention have been set forth in the foregoing description, together with the details of the structure and function of the invention, the disclosure is illustrative only. Changes may be made in detail, especially in matters of shape, size, arrangement of parts and ranges of variable parameters, within the principles of the invention, to the full extent indicated by the broad, general meaning of the appended claims.

We claim:

1. A method of recycling laden fluids containing explosives or neutralized chemical agents comprising
    (a) clarifying a laden fluid by allowing explosive or neutralized chemical agent particulate suspended in said laden fluid to settle out of said laden fluid obtained from the washout of explosive or chemical agent from bodies containing such;
    (b) filtering the laden fluid through a sand filter, and
    (c) processing a saturated solution of explosive or neutralized chemical agent through a reverse osmosis means.

2. The method of claim 1 wherein the laden fluid comprises:

aliphatic and aromatic hydrocarbons, ketones, alcohols, glycols, esters, water and mixtures thereof, aqueous and non-aqueous solutions of neutralizing agent for the neutralization of chemical agents, liquified gases, or liquified solids.

3. The method of claim 2 wherein the laden fluid comprises:

toluene, naphtha; ethylene or propylene glycol; hexane; cyclohexane; acetone; ethanol; butanol; ethyl acetate; n-butyl acetate; liquified carbon dioxide, argon or nitrogen; liquified microcrystalline wax; or low temperature eutectic alloys.

4. The method of claim 1 comprising the additional step of processing the settled out particulate in a filter press means such that a portion of the explosive or neutralized chemical agent remaining in the settled out particulate is separated from the settled out particulate and formed into a filter cake.

5. The method of claim 4 wherein the filter cake formed by the filter press means is about 30% fluid.

6. The method of claim 1 wherein the permeate resulting from the reverse osmosis means is less than about 10 ppm explosive or neutralized chemical agent.

7. A method of recycling explosive laden fluid comprising:

(a) clarifying the explosive laden fluid obtained from the washout of a body containing such explosive wherein explosive particulate suspended is allowed to settle out of the explosive laden fluid;

(b) processing the settled out particulate in a filter press means such that a portion of the explosive remaining in the settled out particulate is separated from the settled out particulate and formed into filter cake;

(c) channeling back into a clarifier the settled out particulate remaining after processing out the filter cake;

(d) filtering the explosive laden fluid remaining after clarification through a sand filter means; the fluid filtered by the sand filter means being a saturated solution of explosive;

(e) processing the saturated solution of explosive by a reverse osmosis means;

(h) channeling the permeate resulting from the reverse osmosis means away from the reverse osmosis means;

(i) channeling the concentrate resulting from the reverse osmosis means back into the sand filter means.

8. The method of claim 7, wherein the laden fluid comprises: aliphatic and aromatic hydrocarbons, ketones, alcohols, glycols, esters, water and mixtures thereof, aqueous and non-aqueous solutions of neutralizing agent for the neutralization of chemical agents, liquified gases, or liquified solids.

9. The method of claim 8, wherein the laden fluid comprises:

toluene, naphtha; ethylene or propylene glycol; hexane; cyclohexane; acetone; ethanol; butanol; ethyl acetate; n-butyl acetate; liquified carbon dioxide, argon or nitrogen; or liquified microcrystalline wax or eutectic alloys.

10. The method of claim 8, wherein the laden fluid is water.

11. The method of claim 10, wherein the filter cake formed by the filter press means is about 30% water.

12. The method of claim 7, wherein the permeate resulting from the reverse osmosis means is less than about 10 ppm explosive.

13. A method of recycling neutralized chemical agent particulate suspended in laden fluid comprising:

(a) clarifying the laden fluid obtained from the washout of a body containing such chemical agent wherein neutralized chemical agent particulate is allowed to settle out of the laden fluid;

(b) processing the settled out particulate in a filter press means such that a portion of the neutralized chemical agent remaining in the settled out particulate is separated from the settled out particulate and formed into filter cake;

(c) channeling back into a clarifier the settled out particulate remaining after processing out the filter cake;

(d) filtering the laden fluid remaining after clarification through a sand filter means; the fluid filtered by the sand filter means being a saturated solution of neutralized chemical agent;

(e) processing the saturated solution of neutralized chemical agent by a reverse osmosis means;

(h) channeling the permeate resulting from the reverse osmosis means away from the reverse osmosis means;

(i) channeling the concentrate resulting from the reverse osmosis means back into the sand filter means.

14. The method of claim 13, wherein the laden fluid is an aqueous or non-aqueous solution of a neutralizing agent.

15. The method of claim 14, wherein the laden fluid is water or a mixture of water and a water-miscible solvent solution of a neutralizing agent.

16. The method of claim 15, wherein the water-miscible solvent is an alcohol, ketone, glycol or ester.

17. The method of claim 16, wherein the water-miscible solvent is ethylene or propylene glycol, acetone, ethanol, butanol, ethyl acetate, or n-butyl acetate.

18. The method of claim 15, wherein the neutralizing agent is an alkali or alkaline earth metal hydroxide or hypochlorite.

19. The method of claim 13, wherein the permeate resulting from the reverse osmosis means is less than about 10 ppm neutralized chemical agent.

\* \* \* \* \*